United States Patent Office 2,975,060
Patented Mar. 14, 1961

2,975,060

COCOA BUTTER SUBSTITUTES AND PRODUCTS CONTAINING THEM

Ronald Lobley Best, Bexley Heath, Antony Crossley, Springfield, and Stanley Paul, Prenton, England, Hermann Pardun, Kleve, Germany, and Cornelis Johannes Soeters, Rotterdam, Netherlands, assignors to Lever Brothers Company, New York, N.Y., a corporation of Maine Filed Dec. 28, 1959, Ser. No. 464

12 Claims. (Cl. 99—118)

This invention relates to cocoa butter substitutes and to products containing them.

This is a continuation-in-part of application Serial No. 565,758, filed February 15, 1956, now abandoned.

The main use of cocoa butter is in chocolate. In the manufacture of good quality chocolate the "nib" or decorticated cocoa bean is ground and to it are added sugar, flavorings and additional cocoa butter. The amount of additional cocoa butter depends upon the type of chocolate and is usually between 25% and 100% of the amount of cocoa butter already present in the ground nib.

Figure 1:
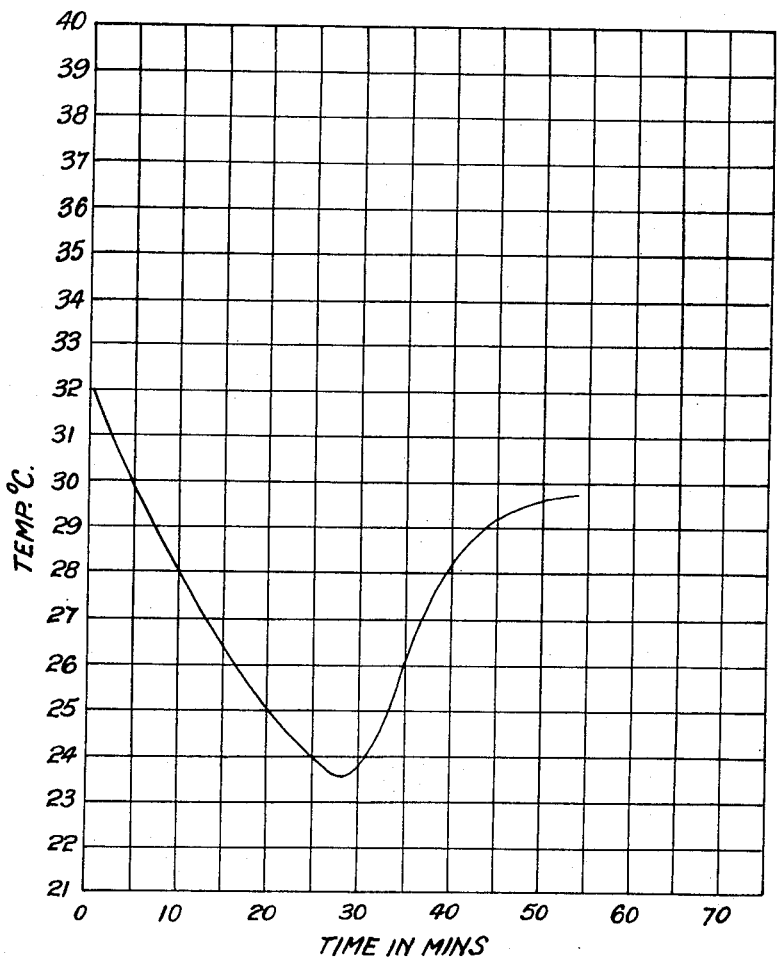

The physical characteristics of such chocolate arise mainly from the cocoa butter present. Cocoa butter is unusual among naturally-occurring fats in that it is normally a brittle solid to about 25° C., has a relatively narrow melting range and is almost completely liquid at 35° C. It also has a characteristic cooling curve; a typical cooling curve for cocoa butter is shown in Fig. 1. (All references in this specification to cooling curves, softening points and dilatations are to be construed as measured by the methods described below.)

Cocoa butter is expensive and many attempts have been made to find a cheaper fat to substitute for at least part of the cocoa butter which is added to the ground nib. In addition, attempts have been made to find a fat which can be used to make chocolate from partly or completely defatted ground cocoa bean. Presently known cocoa butter substitutes, such as palm kernel stearin, melt at approximately the same temperature as cocoa butter. Although such fats are generally inferior in certain characteristics to natural cocoa butter, they have been used as a total replacement therefor. The known cocoa butter substitutes generally cannot be used in admixture with cocoa butter, however, because such mixtures display eutectic effects and melt at temperatures lower than the melting point of either cocoa butter alone or the substitute alone. Such mixtures are thus virtually useless to the manufacturers of good quality chocolate. A cocoa butter substitute which can be mixed with cocoa butter over a wide range of proportions without the formation of undesirable eutectic mixtures has long been desired by the industry.

In addition to its use in chocolate, cocoa butter is also used for many purposes in confectionery, for example, in couvertures, because of its properties of remaining solid at temperatures up to about 25° C. and melting at body temperature.

The present invention is based on the discovery that a certain range of fats and mixtures of fats can be used as cocoa butter substitutes. The substitutes may be used in products in which cocoa butter is normally incoporated, in particular in chocolate. Surprisingly, it has been found that mixtures of the substitutes of this invention with cocoa butter over a wide range of proportions do not display undesirable eutectic effects. Thus, mixtures of the certain fats of this invention with cocoa butter over a wide range of proportions can be used in the preparation of high quality chocolate without substantial change in the usual process conditions used.

The present invention relates to products in which cocoa butter is normally incorporated, characterized in that at least part of the cocoa butter is replaced by the fraction of palm oil remaining after removal of at least about 50%, by weight of the palm oil, of a low melting glyceride fraction.

It is advantageous to remove also a proportion of the highest melting glyceride fraction.

Suitable palm oil fractions for use according to the present invention are those having an iodine value not exceeding 45, preferably not exceeding 42, a softening point in the range 30 to 45° C., preferably 30 to 40° C., and a dilatation at 20° C. of not less than 1000, preferably not less than 1200.

The most widely useful palm oil fractions are those having an iodine value in the range 30 to 36, a softening point within the range 32 to 37° C. and a dilatation at 20° C. of not less than 1500, preferably not less than 1700.

In an alternative aspect, the invention includes palm oil fractions having an iodine value not exceeding 45, preferably not exceeding 42, a dilatation at 20° C. of not less than 1000, a dilatation at 25° C. of not less than 600, a dilatation at 30° C. of not less than 100 and a dilatation at 35° C. of not greater than 600. Preferably, the dilatation at 20° C. is at least 1200; the dilatation at 25° C. is not less than 700.

Preferred palm oil fractions are those having an iodine value in the range 30 to 40, preferably within the range 30 to 35, a dilatation at 20° C. of not less than 1500, preferably not less than 1700, a dilatation at 25° C. of not less than 1000, preferably not less than 1200, a dilatation at 30° C. of not less than 300, preferably not less than 400, and a dilatation at 35° C. of not greater than 600, preferably not greater than 300.

The dilatation at 20° C., the iodine value and the softening point which the palm fractions to be used according to the invention should possess depend on the product in which they are to be used, the desired quality of that product, and the degree of replacement of cocoa butter by the palm oil fraction. For example, when used in chocolate as a substitute for a high proportion or substantially all of the cocoa butter normally present it is necessary that the dilatation at 20° C. of the palm oil fraction should be high enough to provide the physical characteristics such as "snap" required in the chocolate. In addition, the fraction should have melted substantially completely at body temperature. When used to replace lower proportions of cocoa butter the dilatation at 20° C. can be lower, and complete melting of the fraction at body temperature is not essential.

When used to replace, for example, substantially all the cocoa butter normally present in chocolate, the dilatation at 20° C. of the palm oil fraction should be at least 1500, preferably not less than 1700 and the softening point should not be greater than 37° C. When used to replace, for example, half the cocoa butter normally present, useful results may be obtained when the dilatation at 20° C. is not less than 1200 and the softening point not greater than 40° C., while for example, when used to replace about 25% by weight of the cocoa butter normally present, fractions having a dilatation at 20° C. of not less than 1100 and a softening point not greater than 42° C. may be useful. When even smaller proportions of substitute are used, for example 10% of the total, useful results can be obtained when the softening point is not over 43° C. Because of the relative costs of cocoa butter and the substitute, replacement of even 5% of the cocoa butter by the palm oil fraction is useful; at such proportions the softening point of the fraction may be above 43° C.

The palm oil fractions can be mixed with cocoa butter prior to incorporation in, for example, chocolate, and the invention accordingly includes mixtures of cocoa butter and a palm oil fraction having the characteristics set out above, especially mixtures containing 10 to 50%, and especially 25 to 50%, of the palm oil fraction. While these are preferred ranges, mixtures of cocoa butter with the palm oil fractions of this invention containing from 5% to 98% and more of palm oil fraction are useful.

Fractions according to the invention are prepared by removing from palm oil at least 50%, preferably 60%, by weight of the palm oil, of a low melting glyceride fraction; that is, a fraction which is liquid at normal room temperatures (about 20° C.). It is also preferable, but not necessary in the case of fractions to be used in relatively low proportions to cocoa butter in the final product, to remove a proportion of the highest melting glyceride fraction, that is, a fraction containing fully saturated glycerides. The proportion of the highest melting glyceride fraction to be preferably removed is of the order of 5–15% by weight of the palm oil.

The fractionation of the palm oil may be carried out by fractional crystallization from a solvent. When only a low melting glyceride fraction is to be removed, a single crystallization may suffice, but it may be advantageous to carry it out in two stages; similarly when a proportion of the highest melting glyceride fraction is also to be removed, two or more crystallizations can be used. In the following description of fractionation procedure, substantially anhydrous acetone, i.e., containing no more than 1% residual water is used as the solvent but other solvents for example substantially anhydrous ether may be used.

In order to remove the low melting glyceride fraction in a single crystallization an amount of acetone between 3 and 10 mls. per gram of fat can be used. This amount of acetone can be reduced if the number of crystallizations is increased, or if a large number of washes is used. The temperature of crystallization depends on the conditions used, in particular the solvent ratio. With ratios of the order given, temperatures of from about −3° C. to about 6° C. may be used.

Various cooling procedures may be used. The oil may be dissolved in acetone at 15° C. or higher and then the solution cooled to the desired temperature. The solution may be allowed to cool undisturbed, but the time required is shortened considerably (20–30 minutes instead of many hours) if it is stirred throughout. Cooling may also be effected by distilling off part of the solvent under reduced pressure. An alternative procedure is to mix cold acetone with hot oil, the temperatures of these being such that the mixture is at the desired crystallization temperature.

All crystallizations are preferably left at the crystallization temperature until no further precipitation takes place. The precipitate may then be filtered off, preferably with the application of vacuum or pressure and then washed, either on or after removal from the filter, with chilled acetone at a temperature 1–2° C. lower than the crystallization temperature.

An alternative procedure which has been found particularly satisfactory is to draw off the mother liquor and washing liquids instead of filtering. In order to obtain crystals in a suitable form for this procedure, the oil-in-acetone solution should be above 30° C. before cooling commences and stirring should be carried out throughout the cooling. Under these conditions the crystals settle rapidly and the mother liquor can be drawn off. The degree of removal of the low melting glyceride fractions from the solid crystals will depend on the number of washes, but normally 4 to 6 will be sufficient. After each wash the wash liquor is drawn off, and can conveniently be used for crystallization of the next batch of palm oil.

The removal of the highest melting glyceride fraction can be carried out by means of similar techniques, the ratio of acetone to oil being preferably in the range of 4–20 ml. per gram of oil and the crystallization temperature in the range of 15–30° C. This can be carried out before or after the removal of the low melting glyceride fraction, and may likewise be carried out as two or more separate crystallizations.

A preferred manner of fractionating is to dissolve a fresh portion of palm oil in the filtrate containing some low melting fraction obtained from a previous recrystallization carried out at about 5–10° C.

The palm oil may be refined before or after fractionation.

It has also been found that the usefulness of the palm oil fractions specified can be increased by mixing them with certain naturally occurring vegetable fats other than cocoa butter, in particular Borneo tallow, and the invention includes mixtures of these fats, described more particularly below, with the palm oil fractions.

The effect of the addition of these fats, and in particular Borneo tallow, to the palm oil fractions is to give a substitute having a cooling curve closer to that of cocoa butter itself than has the palm oil fraction alone.

These additional fats are characterized by a high content, 50% or more, preferably 60–70% or more, of triglycerides containing one unsaturated fatty acid radical, and two saturated fatty acid radicals derived from palmitic and/or stearic acids. The remainder of the fat is preferably diunsaturated glycerides, with at the most not more than a few percent of trisaturated or triunsaturated glycerides. The unsaturated fatty acid radicals of the glycerides of these additional fats should be substantially wholly those of the normal cis-form of 9:10-oleic acid. Stearic acid radicals should form at least 50% of the saturated acid radicals of the disaturated glycerides. Preferably the proportion is of the order of 75%. Such naturally occurring vegetable fats are hereinafter called "Borneo tallow type fats."

The naturally occurring vegetable fats which fulfill the requirements set out above are Borneo tallow, (commonly marketed under the name "Illipe Butter"), which is generally derived from *Shorea robusta* and *Shorea stenoptera*, and fats derived from *Allanblackia floribunda, Allanblackia stuhlmannii, Garcinia indicia, Pentadesma butyracea,* or *Palaquium oleosum.*

The proportions in which these fats may be added to the palm oil fraction will depend upon the nature of the fat and the particular palm oil fraction used. The minimum proportion will normally, however, be about 20% by weight of the mixture but higher proportions, for example 50 to 75% or more, may be used.

In the melting of fats a characteristic change of volume is observed which, especially in the case of fats solid at the normal temperature, manifests itself in a sudden increase in the volume.

The dilatation or isothermal melting expansion of a fat is the volume increase, which is expressed in $mm.^3$, determined under the conditions of the following procedure and referred to 25 g., the reference temperature being given.

The dilatometer is of glass and consists of a vertical graduated capillary tube joined at its lower end by a U-shaped capillary tube to a glass bulb surmounted by a neck which is internally ground to take a hollow ground glass stopper. The height (above the lowest point of the U-shaped capillary) of the top of the graduated tube and the top of the mouth of the bulb are 350 mm. and 70 mm. respectively. The graduations extend over a length of 250 to 290 mm., and start 1 cm. from the upper end of the tube. The graduations are marked in intervals of 5 $mm.^3$, (accurately calibrated) and cover a total volume of 900 $mm.^3$. The internal diameter of the bulb is 20 mm. and it has a volume of 7 ml. (tolerance±0.5 ml.). The internally ground neck of the bulb tapers downwards from an internal diameter of 15 mm. to an internal diameter of 12 mm. and is 26 mm. long. The bulb of the instrument is thus below the level of the graduations on the capillary tubing. The stopper to be inserted in the mouth of the bulb is about 95 mm. in length (including the ground portion), and is hollow and is partly filled with lead shot to hold it firmly in position while a dilatation is being determined.

1.5 ml. of well boiled distilled water containing a little blue ink is pipetted into the bulb of the dilatometer. The dilatometer is then weighed. A sample of the fat to be examined is thoroughly de-gassed by heating at 100° C. under vacuum. The fat (at about 60° C.) is then poured into the bulb of the dilatometer and the ground glass stopper is inserted, care being taken not to include any air. The amount of fat added is such that, during the determination, the level of water never falls below the lowest of the graduations and never rises above the top of the graduations. If the initial water level on filling is about two-thirds of the height of the graduated capillary, these conditions are usually fulfilled. The dilatometer is re-weighed to obtain the weight of fat added. The hollow stopper is then partly filled with lead shot. It is then placed in a water bath maintained at 60° C. (±0.1°) and a reading of the level of the water in the capillary is made. This is the "base reading," $R_{60}$.

The filled dilatometer is chilled in an ice water bath for 1½ hours. It is then allowed to warm in an air bath to 26° C. at which temperature it is maintained for forty hours. It is then again chilled in an ice water bath for 1½ hours and then placed in a water bath at 20° C. (±0.1° C.), the dilatometer being immersed to such a depth that the water level is above the middle of the ground glass stopper.

The position of the water meniscus in the capillary is read every half hour until two successive readings differ by no more than 2 mm.³. The final reading ($R_t$) is used in the calculations.

A similar procedure is adopted for each temperature $t$ at which the dilatation is required. Thus $R_{20}$, $R_{25}$, $R_{30}$ and $R_{35}$ are successively determined.

Finally the dilatometer is heated again to 60° C. and the "base reading" is re-determined. If the initial and final "base reading" differ by more than 2 mm.³, the whole operation must be repeated.

The value of the dilatation is calculated from the following formula:

$$D_t = \frac{25(R_{60} - R_t)}{W} - A$$

where $D_t$ = dilatation at $t°$ C.
$W$ = weight of fat taken in grams
$R_{60}$ = base reading (mm.³)
$R_t$ = reading of the capillary at $t°$ C. (mm.³), and
A is given in the table below:

| $t°$ C. | A |
|---|---|
| 20 | 880 |
| 25 | 770 |
| 30 | 665 |
| 35 | 555 |

Figure 2:
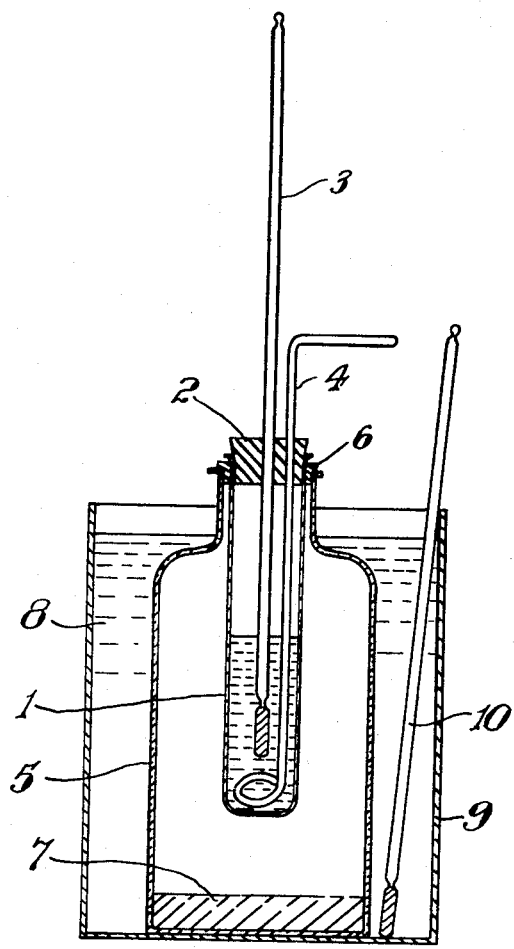

The apparatus to be used for determining cooling curves for the purposes of this specification is shown in Fig. 2 and comprises a test tube 1 of 1½ inches diameter provided with a cork 2 through which a thermometer 3, graduated from 0–70° C. in 1/10 degree, and a glass stirrer 4 have been inserted. The test tube 1 is inserted into a glass jar 5, the base of which is 4½ inches in diameter, and supported in that position by a cork 6. The glass jar is weighted by a quantity of mercury 7 and immersed to its shoulders in a water jacket 8 contained in a vessel 9 of seven inches diameter and eight inches height. The vertical distance from the cork 6 to the bottom of the test tube 1 is eight inches. The level of the mercury is well below the bottom of test tube 1. The temperature of the water jacket may be read by thermometer 10 which is graduated from 0 to 100° C.

The method of determination is as follows.

The fat is melted and heated to 60° C. and 75 gms. placed in the test tube and allowed to cool in air to 40° C., the test tube is then replaced in the apparatus with the water jacket at 17° C. and the fat is allowed to cool, the water jacket being maintained at 17° C. throughout the determination. Starting at 35° C., the fat is stirred with one up-and-down motion of the stirrer at a constant gentle speed every 15 seconds at 5, 20, 35, and 50 seconds past every minute and the temperature reading taken on the minute. The stirring is discontinued when the rise in temperature ceases to be as great as 0.1° C. per minute. It is important when stirring not to break the surface of the oil.

The softening point is determined by a modification of the method published by Barnicoat in "The Analyst" 69, pages 176–178, after stabilizing the fat. In this modified method 0.5 ml. of mercury is placed in a lipped 6 x 1 cm. test tube and the tube and contents chilled for five minutes in crushed ice and water.

1 ml. of fat melted at 100° C. is poured on to the mercury and the filled tube allowed to stand in ice and water for ninety minutes. The fat in the tube is then stabilized in the same manner as described for the dilatometer, allowing the temperature to rise gradually to 26° C. and keeping it at 26° C. for forty hours. A ⅛ inch diameter ball bearing is placed in the depression in the fat surface which forms when the fat is cooled. The tube is then attached to a thermometer graduated in 1/10 of a degree so that the fat column is on a level with the thermometer bulb. This is conveniently done by attaching a metal plate to the thermometer, the plate having several holes in which a tube or tubes may be suspended by the lip or lips. The thermometer and tube or tubes are immersed in a water bath equipped for stirring so that the tube or tubes are immersed to a depth of 4.5 cms. The determination is commenced with the water bath at 20° C., at which temperature it is maintained for twenty minutes. The temperature of the water bath is then raised at the rate of 0.5° C. per minute, while stirring the water vigorously. The temperature when the steel ball has fallen half way through the fat column is recorded as the softening point.

In addition to the palm oil fractions of this invention, the natural cocoa butter, and the Borneo tallow type fats, the chocolate compositions made according to this invention may contain minor amounts of other fats known to be compatible with the fat phase of conventional chocolate compositions. For example, it is well known to include various amounts of milk fat, in the form of milk powder, in chocolate compositions designated as milk chocolate. These compatible fats, at their customary level, are optionally included in the compositions of this invention.

The following examples illustrate the manufacture of fractions for use according to the invention. In crystallizations involving acetone, substantially dry acetone (residual water not more than about 1%) should be used.

Example 1

400 grams of refined deodorized palm oil of I.V. 53.7 were mixed with 4 liters of acetone and the mixture warmed until a clear solution was obtained (35° C.). The solution was allowed to stand in a refrigerator for three days at −3° C. without stirring. The slurry formed was filtered through a cooled Büchner funnel with vacuum. The filter cake was pressed with a glass plunger and then washed on the filter with 1 liter of acetone at —3° C. The cake was then removed from the filter and the residual acetone was distilled off under vacuum. The yield was 188 grams of a fraction having an I.V. of 35.9. The dilatation at 20° C. of the fraction was 1540, the dilatation at 25° C. of the fraction was 1420, the dilatation at 30° C. of the fraction was 765 and the dilatation at 35° C. of the fraction was 430.

*Example 2*

(a) 300 grams of refined deodorized palm oil of I.V. 53.4 were mixed with 1½ liters of acetone and the mixture warmed until a clear solution was obtained (30° C.). The solution was then cooled to 6.5° C. over ½ hour while being gently stirred with a glass rod. It was allowed to stand for ½ hour at 6.5° C. and then filtered through a cooled Büchner funnel with vacuum. The cake was pressed with a glass plunger and then washed twice on the filter using 250 ml. acetone at 5° C. for each wash, the cake being pressed between each wash. It was then removed from the filter and the residual acetone distilled off under vacuum. The yield was 93.9 grams of a fraction having an I.V. of 28.9.

(b) To 80 grams of the product of stage (a) were added 80 ml. of acetone and the mixture warmed to 45° C. To this were added 400 ml. of acetone at 19° C. with stirring and the final temperature of the mixture adjusted to 26° C. It was allowed to stand at this temperature for twenty minutes and then filtered through a Büchner funnel, pressed and washed on the filter with 250 ml. acetone at 26° C. The filtrate and wash liquor were combined and the acetone removed by distillation under vacuum. The yield was 67.5 grams of a fraction having an I.V. of 33.6. The dilatation at 20° C. of the palm oil fraction was 1870, the dilatation at 25° C. of the palm oil fraction was 1650, the dilatation at 30° C. of the fraction was 635 and the dilatation at 35° C. of the fraction was 180.

*Example 3*

3 kg. of crude palm oil of I.V. 52.9 containing 2% free fatty acids were dissolved in 20 liters of acetone and the mixture brought to 45° C. It was then cooled with stirring by hand to 0.7° C. and stabilized by stirring for ten minutes at that temperature. After drawing off the mother liquor the precipitate was washed by stirring with six successive 5 liter portions of acetone previously cooled to 0.7° C., the crystals being allowed to settle and the wash liquor drawn off after each wash. The first four wash liquors were reserved for crystallization of a further 3 kg. of palm oil and the fifth and sixth wash liquors reserved to form the first and second washes for a next batch. After the sixth wash the wet crystals were heated to 45° C. when a clear liquor resulted. This was then cooled with stirring to 25° C. when the high melting point glycerides crystallized out with a rise of 1° C. in temperature. When crystallizations appeared to be complete, the mixture was cooled to 20° C. and stabilized by stirring for ten minutes. After settlement of the crystals the clear liquor was drawn off and the acetone removed from it by distillation under vacuum. The yield was 29% of a fraction having an I.V. of 33.1 and a dilatation at 20° C. of 1830, a dilatation at 25° C. of 1595, a dilatation at 30° C. of 300 and a dilatation at 35° C. of 25.

Figure 3:
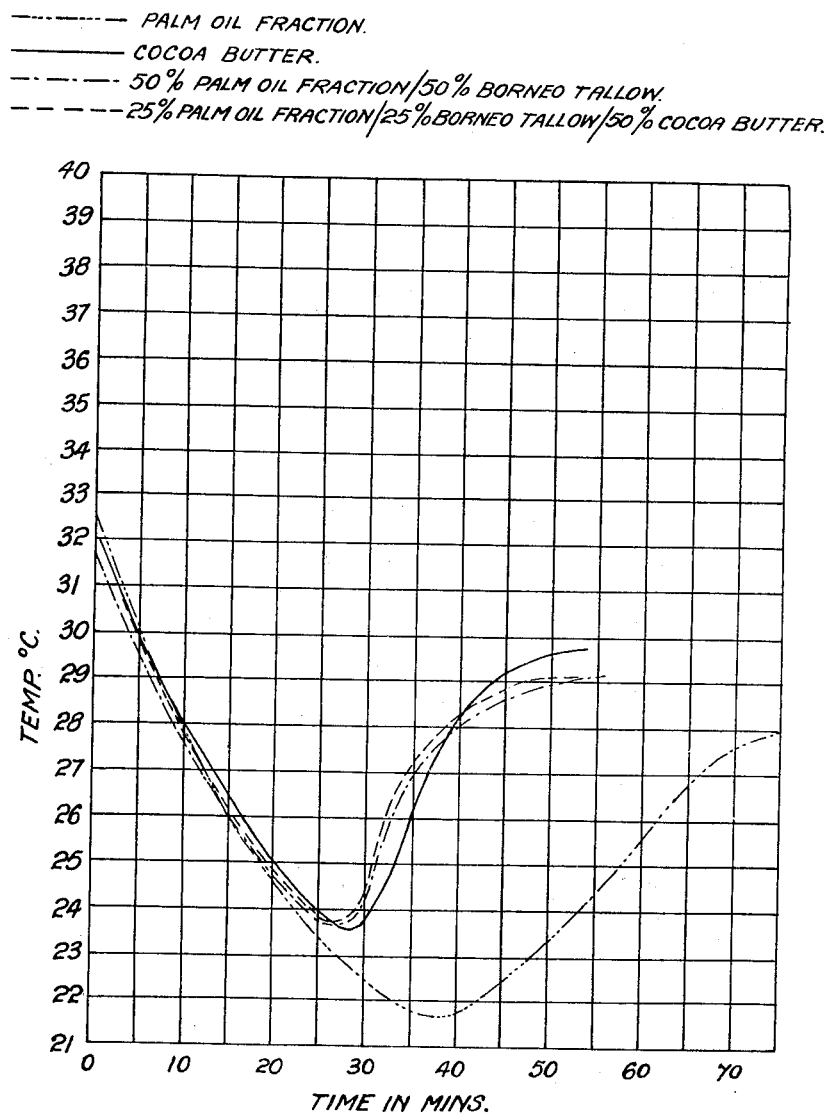

Fig. 3 shows the cooling curves of the palm oil fraction as prepared in Example 3 above, cocoa butter alone, a mixture of 50% of the palm oil fraction and 50% of Borneo tallow and a mixture containing 25% of the palm oil fraction, 25% Borneo tallow and 50% cocoa butter.

*Example 4*

100 kg. edible palm oil was dissolved at 32° C. in 550 liters of acetone, this solution cooled down to 2° C. in 2½ hours and the slurry kept at 2° C. for a further 1½ hours. After filtering and washing with 10 liters of acetone at 2° C. the crystallisate, containing 60 kg. fat, was dissolved at 30° C. in an amount of acetone to bring the volume to 500 liters.

The solution was cooled down to 24° C. and kept at 24° C. for another 1½ hours, with gentle agitation. The crystals were filtered and washed with 5 liters of acetone at 24° C.; when freed of acetone this high-melting fraction amounted to 10 kg.

The filtrate was cooled in 2½ hours to 10° C. and kept at 10° C. for another 1½ hours, with gentle stirring. After filtering, washing with 10 liters of acetone at 10° C. and removing the acetone, 25 kg. of fat representing the desired fraction were obtained. The dilatation at 20° C. of this product was 1970, the softening point 34° C. and the I.V. 32.5.

*Example 5*

100 kg. of palm oil were dissolved at 32° C. in the filtrate obtained from the 25 kg. of crystals of the previous example and sufficient fresh acetone to bring the volume to 500 liters. The solution was cooled to 5° C. in 2½ hours with gentle agitation and kept for 1½ hours at 5° C. After filtering and washing with 10 liters of acetone at 5° C. the crystallisate contained 55 kg. of fat.

The crystals were dissolved at 30° C. in acetone to a total volume of 500 liters, cooled to 26° C. in 2½ hours and kept at 26° C. for another 1½ hours, with gentle stirring. The high-melting fraction obtained in filtering, washing with 5 liters of acetone at 26° C. and removing acetone, amounted to 18 kg.

The filtrate was cooled to 5° C. in 2½ hours and kept at 5° C. for another 1½ hours, with gentle stirring. The slurry was filtered and the filtrate kept for dissolving a subsequent batch of palm oil. The crystallisate, after removing acetone, amounted to 30 kg. and represented the desired fraction. The dilatation of this product at 20° C. was 1805, the softening point was 35° C. and the I.V. 32.0.

*Example 6*

NOTE.—Particular care must be taken in crystallizations involving ether, to dry the ether before use and to perform the crystallization in a dry atmosphere or in an apparatus excluding moisture.

(a) 700 grams of refined palm oil of I.V. 51.7 were mixed with 4900 ml. of substantially dry ether and the mixture warmed to the boiling point. The solution was then cooled to —20° C. over one hour while being gently stirred with a glass rod. It was then allowed to stand for 15 minutes at —20° C. and then filtered through a cooled Büchner funnel with vacuum. The cake was pressed with a glass plunger and then washed with 500 ml. of ether at —20° C. The cake was then removed from the filter and stirred for 10 minutes with 1600 ml. of ether at —20° C. Residual ether was removed from the cake by distillation under vacuum. The yield was 197 grams of a product having an I.V. of 25.6.

(b) 194 grams of the product of stage (a) were mixed with 1360 ml. of substantially dry ether and the mixture warmed to the boiling point. The resultant solution was cooled to 12° C. while gently stirring with a glass rod. It was allowed to stand at this temperature for 30 minutes with occasional stirring and then filtered through a cooled Büchner funnel and the cake pressed and washed on the funnel with 300 ml. of substantially dry ether at 12° C. The filtrate and wash liquor were combined and the ether removed by distillation under vacuum. The yield was 132 grams of a fraction having an I.V. of 31.0; a dilatation at 20° C. of 2045 and a softening point of 36.0° C.

The following examples illustrate the use of fractions according to the invention.

*Example 7*

The products of Examples 4 and 5 were used as cocoa butter substitutes in chocolates made according to the formula:

30% cocoa mass (containing 50% cocoa butter)
20% substitute
47% sugar
3% skim milk powder The ingredients were mixed at 40° C. and the paste refined on a five-roller mill and cooled down to 25° C. in a tempering device provided with edge runners. It was then warmed up to 31° C. and kept for 15 minutes at that temperature. It was then filled into moulds and cooled with air at 10° C. to a temperature of about 20° C.

*Example 8*

Plain chocolates were made according to the general formula:

400 grams "refiner paste" (containing 112 grams cocoa butter)
66 grams additional fat The total fat was thus 178 grams.

The refiner paste was composed of equal parts by weight of sugar and of ground cocoa mass containing 56% of cocoa butter.

The bowl of an end runner mill was warmed to 40° C., the refiner paste was added and the additional fat added slowly, with warming. The chocolate mix was then warmed to 60–65° C. and maintained at this temperature for 2 hours. The mill was then stopped and the chocolate mix poured into a nine inch porcelain evaporating dish. The mix was stirred in a manner such that the formation of air bubbles was minimized, until it became too stiff to stir easily. The chocolate mix was then heated very gently to a point at which it was just pourable, care being taken to avoid overheating. The molten mix was poured into chilled (11–12° C.) moulds, any air bubbles being removed by vigorous tapping. The filled moulds were placed in a refrigerator at 11–12° C. After 48 hours the moulded bars of chocolate were removed from the moulds, stored at room temperature (19° C.) for four days and then examined.

Chocolates were made using the following additional fats:

(a) A mixture of 30.4 grams cocoa butter and 35.6 grams of a palm oil fraction having an iodine value of 42.5, a dilatation at 20° C. of 1220 and a softening point of 32.3° C. The palm oil fraction thus replaced 20% of the cocoa butter normally present.

(b) A mixture of 33 grams of a palm oil fraction having an iodine value of 32.0, a dilatation at 20° C. of 1800 and a softening point of 33.1° C. and 33 grams of a fat derived from *Pentadesma butyracea*.

The mixture (b) thus replaced 37.1% of the cocoa butter normally present.

*Example 9*

Milk chocolates were made according to the general formula:

400 grams "milk refiner paste"
48 grams additional fat

The milk refiner paste was composed of 45% of cocoa mass (containing 56% of cocoa butter), 38% of sugar and 17% of dried full cream whole milk powder.

The method used was the same as that of Example 8, except that after the additional fat was added, the chocolate mix was warmed to 45–50° C. instead of 60–65° C.

Chocolates were made using the following additional fats:

(a) 48 grams of a palm oil fraction having an iodine value of 32.0, a dilatation at 20° C. of 1800 and a softening point of 33.1° C. The fraction thus replaced 31.8% of the cocoa butter normally present.

(b) A mixture of 24 grams of the palm oil fraction used in (a) and 24 grams of a fat derived from *Pentadesma butyracea*. The mixture replaced 31.8% of the cocoa butter normally present.

*Example 10*

Milk chocolates were made to the formula:

| | G. |
|---|---|
| Cocoa powder containing 14% cocoa butter | 40.6 |
| Milk powder (containing 27% milk fat) | 117.3 |
| Sugar (finely ground) | 162.5 |
| Additional fat | 131.0 |
| Lecithin | 0.6 |
| | 452.0 |

The requisite quantities of cocoa powder, sugar and milk powder were ground in an end runner mill for 3 hours. The bowl of the end runner mill was then warmed to about 30° C. and the molten fat mixture, containing the lecithin was added slowly, the mixture being ground in the mill during this process. The chocolate mix was then warmed to 45–50° C. and maintained at this temperature for 2 hours, subsequent treatment being as described in Example 8, page 21, lines 18 to 29, except that it stood 15–20 hours at 15–18° C. before gently reheating; and the chilled moulds and refrigerator were maintained at 8° C. Chocolates were made in which the additional fat consisted (a) Entirely of a palm oil fraction having an iodine value of 36.0, a dilatation at 20° C. of 1735 and a softening point of 32.9° C.;

(b) Entirely of a palm oil fraction having an iodine value of 37.9, a dilatation at 20° C. of 1575 and a softening point of 32.6° C.;

(c) Entirely of a palm oil fraction having an iodine value of 32.8, a dilatation at 20° C. of 1740 and a softening point of 32.2° C.;

(d) Entirely of a mixture of 65.5 grams of a palm oil fraction having an iodine value of 32.0, a dilatation at 20° C. of 1920 and a softening point of 34.1° C., and 65.5 grams of Borneo tallow.

The substitute (palm oil fraction or mixture of palm oil fraction and Borneo tallow) in the above example thus replaced 96% of the cocoa butter normally present.

*Example 11*

Milk chocolates were made according to the general formula of Example 10, and using the method of Example 10.

Chocolates were made with additional fat consisting of:

(a) A mixture of 68.3 grams of a palm oil fraction having an iodine value of 37.9, a dilatation at 20° C. of 1575 and a softening point of 32.6° C., and 62.7 grams of cocoa butter;

(b) A mixture of 34.2 of a palm oil fraction having an iodine value of 32.0, a dilatation at 20° C. of 1920 and a softening point of 34.1° C., to 34.2 grams of Borneo tallow, and 62.7 grams of cocoa butter.

The substitute (palm oil fraction or mixture of palm oil fraction and Borneo tallow) thus replaced 50% of the cocoa butter normally present.

It is understood that the foregoing examples are illustrative only and that modifications will occur to those skilled in the art. Therefore, the invention is not to be limited thereto but is to be defined by the appended claims.

We claim:

1. A fat composition consisting essentially of a fat selected from the group consisting of cocoa butter and a Borneo tallow type fat, in admixture with at least 5%, by weight of the mixture, of a palm oil fraction having an iodine value not exceeding 45, a dilatation at 20° C. of not less than 1000, and a softening point of from 30 to 45° C., the palm oil fraction, when in admixture with Borneo tallow type fat only, amounting to at least 25% by weight of the mixture, and the palm oil fraction, when both Borneo tallow type fat and cocoa butter are present, amounting to at least 25% by weight of the combined weight of the palm oil fraction and borneo tallow type fat.

2. A fat composition consisting essentially of cocoa butter and a palm oil fraction having an iodine value not exceeding 45, a dilatation at 20° C. of not less than 1000, and a softening point in the range of from 30 to 45° C., said palm oil fraction amounting to at least 5% by weight of the mixture.

3. A fat composition consisting essentially of a Borneo tallow type fat and a palm oil fraction having an iodine value not exceeding 45, a dilatation at 20° C. of not less than 1000, and a softening point in the range of from 30 to 45° C., the palm oil fraction amounting to from 25 to 80% by weight of the mixture.

4. A fat composition consisting essentially of cocoa butter, a Borneo tallow type fat, and a palm oil fraction having an iodine value not exceeding 45, a dilatation at 20° C. of not less than 1000, and a softening point in the range of from 30 to 45° C., the palm oil fraction being present at a level of at least 5% by weight of the mixture, and the palm oil fraction and Borneo tallow type fat being present in the ratio of from 25 to 80 parts by weight of palm oil fraction to from 75 to 20 parts by weight of Borneo tallow type fat.

5. Chocolate compositions having, as a fat phase, a mixture of fats consisting essentially of from 50 to 90% by weight of cocoa butter and from 10 to 50% by weight of a palm oil fraction having an iodine value not exceeding 45, a dilatation at 20° C. of not less than 1000, and a softening point in the range of from 30 to 45° C.

6. Chocolate compositions having, as a fat phase, a mixture of fats consisting essentially of from 50 to 90% by weight of cocoa butter, and from 10 to 50% by weight of a submixture of a Borneo tallow type fat and a palm oil fraction having an iodine value not exceeding 45, a dilatation at 20° C. of not less than 1000, and a softening point in the range of from 30 to 45° C., the submixture consisting of from 25 to 80% by weight of the palm oil fraction and from 75 to 20% by weight of the Borneo tallow type fat.

7. Chocolate compositions having, as a fat phase, a mixture of fats consisting essentially of from 50 to 75% by weight of cocoa butter and from 25 to 50% by weight of a palm oil fraction, the palm oil fraction having an iodine value not exceeding 45, a dilatation at 20° C. of not less than 1000, and a softening point of from 30 to 45° C.

8. Chocolate compositions having, as a fat phase, a mixture of fats consisting essentially of from 50 to 75% by weight of cocoa butter and from 25 to 50% by weight of a submixture of a Borneo tallow type fat and a palm oil fraction having an iodine value not exceeding 45, a dilatation at 20° C. of not less than 1000, and a softening point in the range of from 30 to 45° C., the submixture consisting of from 25 to 80% by weight of the palm oil fraction and from 75 to 20% by weight of the Borneo tallow type fat.

9. Chocolate compositions having, as a fat phase, a mixture of fats consisting essentially of a minor amount of milk fat, from 50 to 90% by weight of cocoa butter and from 10 to 50% by weight of a palm oil fraction having an iodine value not exceeding 45, a dilatation at 20° C. of not less than 1000, and a softening point in the range of from 30 to 45° C.

10. Chocolate compositions having, as a fat phase, a mixture of fats consisting essentially of a minor amount of milk fat, from 50 to 90% by weight of cocoa butter, and from 10 to 50% by weight of a submixture of a Borneo tallow type fat and a palm oil fraction having an iodine value not exceeding 45, a dilatation at 20° C. of not less than 1000, and a softening point in the range of from 30 to 45° C., the submixture consisting of from 25 to 80% by weight of the palm oil fraction and from 75 to 20% by weight of the Borneo tallow type fat.

11. A fat composition consisting essentially of a fat selected from the group consisting of cocoa butter and a Borneo tallow type fat in admixture with at least 5%, by weight of the mixture, of a palm oil fraction having an iodine value within the range of 30 to 40, a dilatation at 20° C. of not less than 1500, a dilatation at 25° C. of not less than 1000, a dilatation at 30° C. of not less than 300, and a dilatation at 35° C. of not greater than 300, the palm oil fraction, when in admixture with Borneo tallow type fat only, amounting to at least 25% by weight of the mixture, and the palm oil fraction, when both Borneo tallow type fat and cocoa butter are present, amounting to at least 25% by weight of the combined weight of the palm oil fraction and Borneo tallow type fat.

12. Chocolate compositions having, as a fat phase, a mixture of fats consisting essentially of from 50 to 90% by weight of cocoa butter, and from 10 to 50% by weight of a submixture of a Borneo tallow type fat and a palm oil fraction having an iodine value within the range of 30 to 40, a dilatation at 20° C. of not less than 1500, a dilatation at 25° C. of not less than 1000, a dilatation at 30° C. of not less than 300, and a dilatation at 35° C. of not greater than 300, the submixture consisting of from 25 to 80% by weight of the palm oil fraction and from 75 to 20% by weight of the Borneo tallow type fat.

References Cited in the file of this patent

UNITED STATES PATENTS

| 2,586,615 | Cross | Feb. 19, 1952 |
| 2,903,363 | Farr | Sept. 8, 1959 |

FOREIGN PATENTS

| 590,916 | Great Britain | July 31, 1947 |

OTHER REFERENCES

"The Chemistry, Flavouring and Manufacture of Chocolate Confectionery and Cocoa," by Jensen, J. & A. Churchill, London, 1931, pp. 192, 193, 206 and 207.

"The Chemistry, Flavouring and Manufacture of Chocolate, Confectionery and Cocoa," by Jensen, J. & A. Churchill, London, 1931, pp. 182–191 and 194–205.

Jamieson, G. S.: "Vegetable Fats and Oils," The Chemical Catalog Co., New York (1932), page 40.

Bailey: "Industrial Oil and Fat Products," 2nd Edition (1951), pp. 139 and 140.